(12) United States Patent
Hosobuchi

(10) Patent No.: US 10,416,611 B2
(45) Date of Patent: Sep. 17, 2019

(54) DRIVING DEVICE, STEPPING MOTOR DRIVING METHOD, PROGRAM, AND ELECTRONIC TIMEPIECE

(71) Applicant: CASIO COMPUTER CO., LTD., Tokyo (JP)

(72) Inventor: Hiroyuki Hosobuchi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 287 days.

(21) Appl. No.: 15/440,465

(22) Filed: Feb. 23, 2017

(65) Prior Publication Data
US 2017/0261939 A1    Sep. 14, 2017

(30) Foreign Application Priority Data
Mar. 11, 2016 (JP) .................. 2016-047752

(51) Int. Cl.
| | |
|---|---|
| H02P 8/02 | (2006.01) |
| G04C 3/14 | (2006.01) |
| G04G 5/02 | (2006.01) |
| H02P 29/60 | (2016.01) |
| G04B 47/06 | (2006.01) |
| H02P 8/14 | (2006.01) |
| H02P 8/38 | (2006.01) |

(52) U.S. Cl.
CPC ........... *G04G 5/027* (2013.01); *G04B 47/068* (2013.01); *G04C 3/143* (2013.01); *H02P 8/02* (2013.01); *H02P 8/14* (2013.01); *H02P 8/38* (2013.01); *H02P 29/60* (2016.02)

(58) Field of Classification Search
USPC .................................. 318/685, 696
See application file for complete search history.

(56) References Cited

U.S. PATENT DOCUMENTS

| | | | | |
|---|---|---|---|---|
| 3,969,642 A | * | 7/1976 | Yoshino ............... | G04C 13/11 310/49.32 |
| 4,044,291 A | * | 8/1977 | Hughes ................ | H02K 37/00 310/49.45 |

(Continued)

FOREIGN PATENT DOCUMENTS

| | | |
|---|---|---|
| CN | 1190755 A | 8/1998 |
| CN | 103684152 A | 3/2014 |

(Continued)

OTHER PUBLICATIONS

Chinese Office Action dated Jan. 24, 2019, in a counterpart Chinese patent application 201710142494.0. (A machine translation (not reviewed for accuracy) attached.).

*Primary Examiner* — Bentsu Ro
(74) *Attorney, Agent, or Firm* — Chen Yoshimura LLP

(57) ABSTRACT

A driving device includes a stepping motor having a rotor, a coil for rotating the rotor, and a processor that drives the stepping motor. The processor generates a driving pulse for rotating the rotor of the stepping motor to a prescribed position, and outputs the driving pulse to the coil; and generates a rotation assistance pulse for rotating the rotor of the stepping motor at a prescribed speed, and outputs the rotation assistance pulse to the coil, after outputting the driving pulse but before EMF is produced by the rotation of the rotor of the stepping motor caused by the driving pulse.

10 Claims, 6 Drawing Sheets

(56) References Cited

U.S. PATENT DOCUMENTS

| | | | |
|---|---|---|---|
| 4,088,909 A * | 5/1978 | Matsumura | H02K 37/16 |
| | | | 310/163 |
| 5,550,795 A | 8/1996 | Takakura et al. | |
| 6,108,279 A | 8/2000 | Hara | |
| 6,414,459 B1 * | 7/2002 | Borho | H03K 7/08 |
| | | | 318/599 |
| 2014/0071795 A1 | 3/2014 | Manaka et al. | |
| 2017/0261939 A1 * | 9/2017 | Hosobuchi | H02P 29/60 |

FOREIGN PATENT DOCUMENTS

| | | | |
|---|---|---|---|
| JP | H9-266697 A | 10/1997 |
| JP | 3299756 B2 | 7/2002 |

\* cited by examiner

DRIVING DEVICE, STEPPING MOTOR DRIVING METHOD, PROGRAM, AND ELECTRONIC TIMEPIECE

BACKGROUND OF THE INVENTION

Technical Field

The present invention relates to a stepping motor driving device, a stepping motor driving method, a stepping motor driving program, and an electronic timepiece.

Background Art

In a stepping motor, it is necessary for the rotor to precisely rotate to each step. Thus, a stepping motor driving device determines whether or not the rotor has rotated (rotor rotation detection) by detecting back EMF (back-voltage) produced by damping when, after a driving pulse has been applied to rotate the rotor, the rotor is stopped at a prescribed step angle. A correction pulse is further applied to rotate the rotor in the case where it is determined that the rotor has not rotated.

Japanese Patent Application Laid-Open Publication No. H9-266697 can be given as an example of a motor rotation detection technique used in timepieces. This Patent Document discloses the following: "A driving pulse supplied to a step motor is subjected to chopper control such that the duty cycle of driving pulses is set to be lower in an initial stage and a final stage than in a middle stage. This makes it possible to set an effective power distribution of the driving pulses to be lower in the initial stage and the final stage and higher in the middle stage, causing the step motor to produce a torque matching the cogging torque of the step motor.

The rotor is rotated at a low speed while eliminating wasteful power consumption in the initial stage and final stage of the driving pulses, which makes it possible to reduce the amount of power consumed to drive the step motor."

However, the technique disclosed in the stated Patent Document does not take into consideration temperature characteristics during the rotation detection. As will be described later, when the temperature changes, for example when the temperature drops, the DC resistance value will drop as well. This causes an increase in the current flowing in the motor coils. Magnetic fluxes produced by the motor coils also increase as a result, which in turn increases the rotation speed of the rotor.

Thus according to the technique disclosed in the stated Patent Document, the magnitude of the back EMF during rotation detection will change. For example, according to the technique disclosed in the stated Patent Document, a drop in the back EMF makes it difficult to accurately detect whether or not the rotor has rotated to a prescribed position, resulting in a detection error.

SUMMARY OF THE INVENTION

The present invention provides a driving device, a stepping motor driving method, a program, and an electronic timepiece capable of accurately detecting whether or not a rotor has rotated to a prescribed position. Accordingly, the present invention is directed to a scheme that substantially obviates one or more of the problems due to limitations and disadvantages of the related art.

The following configuration was employed to solve the problems described above.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a driving device, including: a stepping motor including a rotor and a coil to rotate the rotor; and a processor that drives the stepping motor, wherein the processor: generates a driving pulse for rotating the rotor of the stepping motor to a prescribed position, and outputs the driving pulse to the coil; and after outputting the driving pulse but before the driving pulse causes electromotive force to be generated by the rotation of the rotor of the stepping motor, generates a rotation assistance pulse for rotating the rotor of the stepping motor at a prescribed speed.

In another aspect, the present disclosure provides a method of driving a stepping motor, including: outputting a driving pulse that rotates a rotor of the stepping motor to a prescribed position; and after outputting the driving pulse but before the driving pulse causes electromotive force to be generated by the rotation of the rotor of the stepping motor, outputting a rotation assistance pulse for rotating the rotor of the stepping motor at a prescribed speed.

In another aspect, the present disclosure provides a non-transitory storage medium having stored therein instructions executable by a processor serving as a driving device that drives a stepping motor, the instructions causing the processor to perform the following: outputting a driving pulse that rotates a rotor of the stepping motor to a prescribed position; and after outputting the driving pulse but before the driving pulse causes electromotive force to be generated by the rotation of the rotor of the stepping motor, outputting a rotation assistance pulse for rotating the rotor of the stepping motor at a prescribed speed.

It is to be understood that both the foregoing general description and the following detailed description are exemplary and explanatory, and are intended to provide further explanation of the invention as claimed.

DETAILED DESCRIPTION OF EMBODIMENTS

Figure 1:
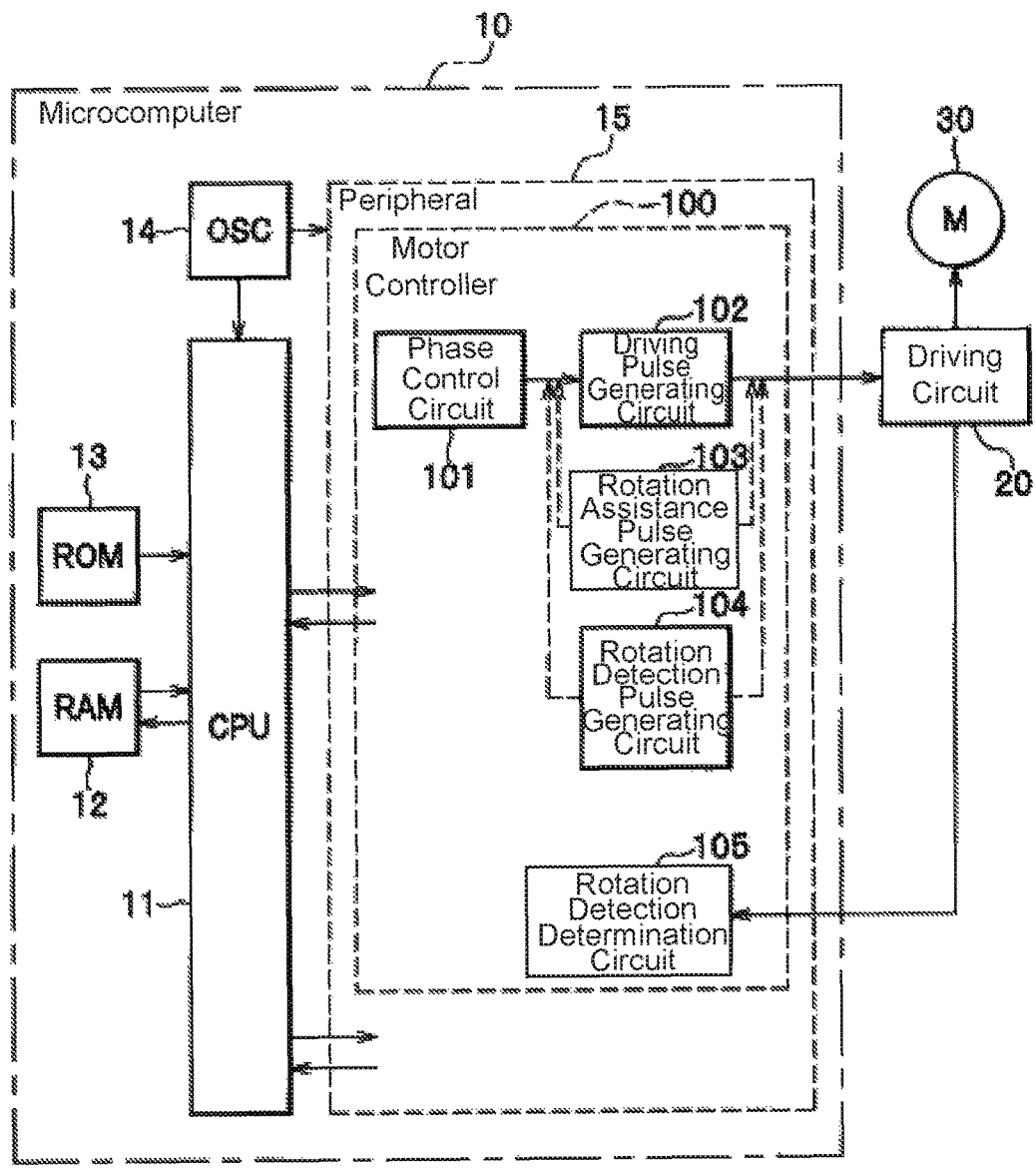
FIG. 1 is a diagram illustrating an example of the circuit block configuration of a microcomputer included in a stepping motor driving device according to Embodiment 1 of the present invention.

Embodiments for carrying out the present invention will now be described with reference to the drawings. As a rule, in all of the drawings illustrating the embodiments, like elements will be assigned like reference numerals and redundant descriptions thereof will be omitted as appropriate.

Embodiment 1: Stepping Motor Driving Device

A stepping motor driving device according to Embodiment 1 of the present invention will be described.

Although the following primarily describes a stepping motor driving device, the descriptions also apply to a stepping motor driving method.

<Stepping Motor Driving Device>

FIG. 1 is a diagram illustrating an example of the circuit block configuration of a microcomputer 10 included in a stepping motor driving device according to Embodiment 1 of the present invention. A stepping motor 30 and a driving circuit (driver) 20 that drives the stepping motor 30 are also illustrated.

Note that while "stepping motor driving device" primarily refers to the microcomputer 10, the microcomputer 10 and the driving circuit 20 together can also be interpreted as constituting the stepping motor driving device.

As illustrated in FIG. 1, the microcomputer 10 includes a central processing unit (CPU; a processor) 11, a random access memory (RAM) 12, a read-only memory (ROM) 13, an oscillator (OSC; oscillation circuit or clock supplier) 14, and a peripheral (peripheral circuit; peripheral circuit unit) 15.

Using the RAM 12 and the ROM 13, which are storage devices (storage units), and the CPU 11 as a processor, which is a processing device (processing unit), the microcomputer 10 executes programs stored in the ROM 13 to carry out prescribed function operations provided in the peripheral 15. The OSC 14 supplies, to the CPU 11 and the peripheral 15, a clock for controlling operations periodically, signals generated on the basis of that clock, and so on.

The peripheral 15 includes a motor controller 100, as well as other circuits aside from the motor controller (not illustrated, but these include an operation function for a clock, a calendar function, and the like, for example).

The motor controller 100 includes a phase control circuit (phase controller) 101, a driving pulse generating circuit (driving pulse generator) 102, a rotation assistance pulse generating circuit (rotation assistance pulse generator) 103, a rotation detection pulse generating circuit (rotation detection pulse generator) 104, and a rotation detection determination circuit (rotation detection determiner) 105. The operations of the phase control circuit (phase controller) 101, the driving pulse generating circuit (driving pulse generator) 102, the rotation assistance pulse generating circuit (rotation assistance pulse generator) 103, the rotation detection pulse generating circuit (rotation detection pulse generator) 104, and the rotation detection determination circuit (rotation detection determiner) 105 may be carried out by a motor controller within a single microcomputer, or individual motor controllers may be provided and the operations carried out by a single microcomputer or a plurality of microcomputers.

Functioning as the motor controller 100, the microcomputer 10 generates various types of pulses for driving and controlling the stepping motor 30 through the driving circuit 20 (driving pulses, rotation assistance pulses, and rotation detection pulses).

Additionally, functioning as the motor controller 100, the microcomputer 10 detects and determines a rotational state of the stepping motor 30 using the rotation detection determination circuit 105.

Functioning as the phase control circuit 101, the motor controller 100 or the microcomputer 10 controls, for example, the inversion of the positive-negative polarity of the driving pulses supplied to the stepping motor 30 every 180 degrees, controls time series and timings at which the driving pulse generating circuit 102, the rotation assistance pulse generating circuit 103, and the rotation detection pulse generating circuit 104 generate driving pulses, rotation assistance pulses, and rotation detection pulses, and so on.

Functioning as the driving pulse generating circuit 102, the motor controller 100 or the microcomputer 10 generates driving pulses for moving (rotating) a rotor 32 of the stepping motor 30 to a prescribed position (angle).

Functioning as the rotation assistance pulse generating circuit 103, the motor controller 100 or the microcomputer 10 generates a rotation assistance pulse for increasing a rotation speed of the rotor that has decreased during rotation so as to rotate the rotor at a prescribed speed.

Functioning as the rotation detection pulse generating circuit 104, the motor controller 100 or the microcomputer 10 generates pulses specifying the timing for detecting and determining whether or not the rotor 32 of the stepping motor 30 has rotated to a prescribed position.

<Scheme for Connecting Stepping Motor, Driving Circuit, and Microcomputer>

Figure 2:
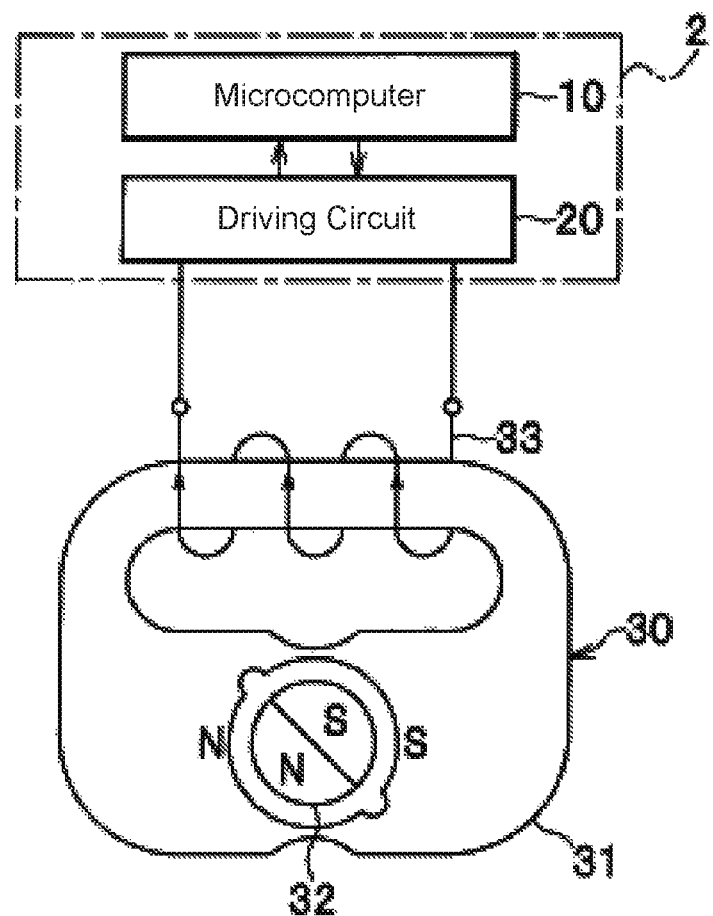
FIG. 2 is a diagram illustrating an example of a scheme for connecting the microcomputer constituting the stepping motor driving device, a driving circuit, and a stepping motor, according to Embodiment 1 of the present invention.

FIG. 2 is a diagram illustrating an example of a scheme for connecting the microcomputer 10 constituting the stepping motor driving device, the driving circuit 20, and the stepping motor 30, according to Embodiment 1 of the present invention.

Note that a stepping motor driving device 2 corresponds to a case where the stepping motor driving device is constituted of the microcomputer 10 and the driving circuit 20 together as described above.

As illustrated in FIG. 2, the stepping motor 30 includes a stator 31, the rotor (rotor magnet) 32, and a motor coil (coil) 33.

Functioning as the motor controller 100 (FIG. 1), a processor 11 (the microcomputer 10) supplies various types of pulses for driving and controlling the stepping motor 30 to the driving circuit 20 (driving pulses, rotation assistance pulses, and rotation detection pulses).

The driving circuit 20 drives and controls the stepping motor 30, and sends signals indicating the rotational state of the rotor (rotor magnet) 32 of the stepping motor 30 to the motor controller 100 or the microcomputer 10 functioning as the rotation detection determination circuit 105 (FIG. 1).

<Relationship Between Driving Waveforms and Rotational Position of Rotor 32>

Next, relationships between driving waveforms and the rotational position of the rotor 32 in situations of various temperatures and pulses applied will be described with reference to FIGS. 3 to 5.

<Relationship Between Driving Waveforms and Rotational Position of Rotor 32 at Normal Temperature>

Figure 3:
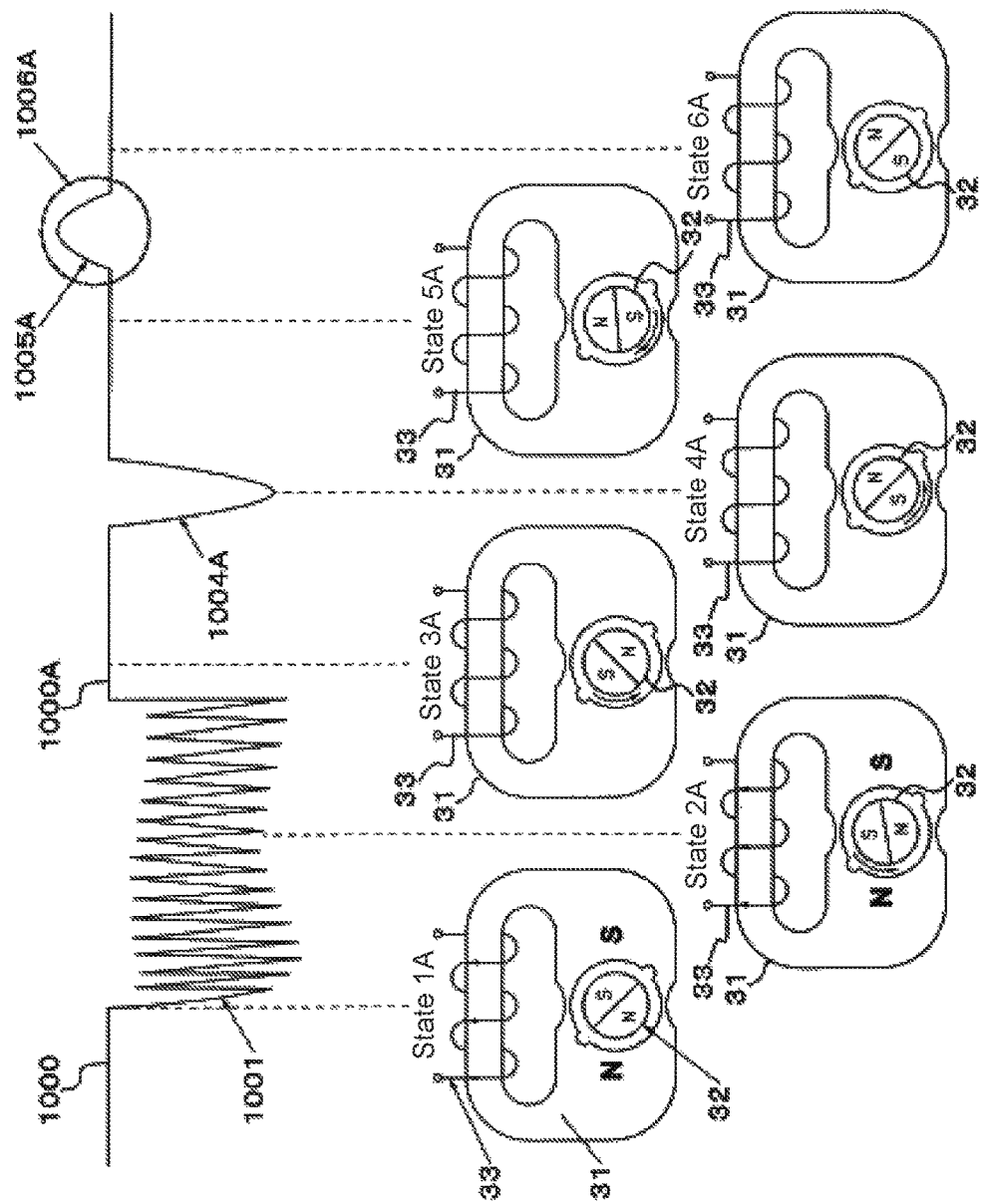
FIG. 3 is a diagram schematically illustrating a relationship between the rotational position of a rotor and driving waveforms (including EMF and back EMF) applied to a motor coil of the stepping motor while at a normal temperature.

FIG. 3 is a diagram schematically illustrating a relationship between the rotational position of the rotor 32 and driving waveforms (including EMF and back EMF) applied to the motor coil 33 of the stepping motor 30 while at a normal temperature.

Although referred to as driving waveforms, it should be noted that the waveforms (1000, 1001, 1000A, 1004A, and 1005A) depict waveforms driving the motor coil 33 together with EMF (back EMF) arising in the motor coil 33.

Rotational states 1A to 6A of the rotor (the rotor magnet) 32 are indicated as well.

In FIG. 3, a driving waveform 1000 indicates a driving waveform at a voltage of 0, when no driving voltage is applied. At this time, the rotational position of the rotor 32 of the stepping motor 30 corresponds to state 1A, which is a first stable state.

Next, a driving waveform 1001, having a repeating pulse form due to a driving pulse, is applied to the motor coil 33 for a prescribed amount of time. Note that the microcomputer 10 can also adjust and control the driving force by controlling the amplitude of the pulses in the driving pulse driving waveform 1001, controlling the pulse width between start and end points of the driving waveform 1001, and so on.

When the microcomputer 10 applies the driving waveform 1001, the rotor 32 rotates to the left (counterclockwise; left rotation in FIG. 3) to state 2A. The rotor 32 then further rotates to the left to state 3A.

When the rotor 32 is in state 3A, the driving waveform returns to a voltage of 0 as a driving waveform 1000A. However, inertia causes the rotor 32 to continue to rotate to the left, reaching state 4A.

Note that state 4A is a state in which inertia remains and carries the rotor 32 slightly past a second stable point.

In state 4A, the positional relationship between the N pole of the rotor (rotor magnet) 32 and the motor coil 33 causes EMF (back EMF, electromotive voltage, back-voltage), indicated by a waveform 1004A, to arise in the motor coil 33.

As above, in state 4A, inertia causes the rotor 32 to continue to rotate to the left and reach state 5A.

State 5A is a state in which the rotor 32 has gone too far by the greatest amount. Upon reaching state 5A, the rotor 32 rebounds and begins rotating to the right (clockwise).

Upon passing state 5A, the rotor 32 rebounds between rotation to the right and rotation to the left. The rebound gradually tapers off until the rotor 32 converges on and stops at state 6A, which is a stable point (a second stable state).

In the period where this rebound occurs (between states 5A and 6A), EMF (back EMF) 1005A arises in the motor coil 33.

Functioning as the rotation detection determination circuit 105 (FIG. 1), via the driving circuit 20 (FIGS. 1 and 2), the processor 11 (the microcomputer 10) uses the EMF 1005A as a rotation detection signal 1006A to detect and determine whether or not the rotor 32 (the stepping motor 30) has correctly rotated 180 degrees.

Note that the driving circuit 20 and the rotation detection determination circuit 105 adjust the rotation detection timing using the rotation detection pulse generated by the rotation detection pulse generating circuit 104.

The rotation speed of the rotor 32 changes depending on the magnitude of a magnetic flux produced by current supplied to the motor coil (coil) 33. The greater the current is, the larger the magnetic flux becomes, and the rotation speed of the rotor 32 increases as a result. Conversely, the lower the current is, the smaller the magnetic flux becomes, and the rotation speed of the rotor 32 decreases as a result.

The current flowing in the motor coil 33 is substantially constant at normal temperature and during normal usage (for example, when showing the current time). Thus the magnitude of the magnetic flux produced is also substantially constant, which ensures the rotor 32 rotates at a constant rotation speed.

The situation changes, however, when the outside temperature changes and the DC resistance value of the motor coil 33 changes as a result. A situation where the temperature is low will be described next.

<Relationship Between Driving Waveforms and Rotational Position of Rotor 32 at Low Temperature>

At a low temperature, the DC resistance value decreases, and thus the current flowing in the motor coil 33 increases. The magnetic flux produced also increases as a result, which in turn increases the rotation speed of the rotor 32. Rotation detection operations carried out in this situation will be described with reference to FIG. 4.

Figure 4:
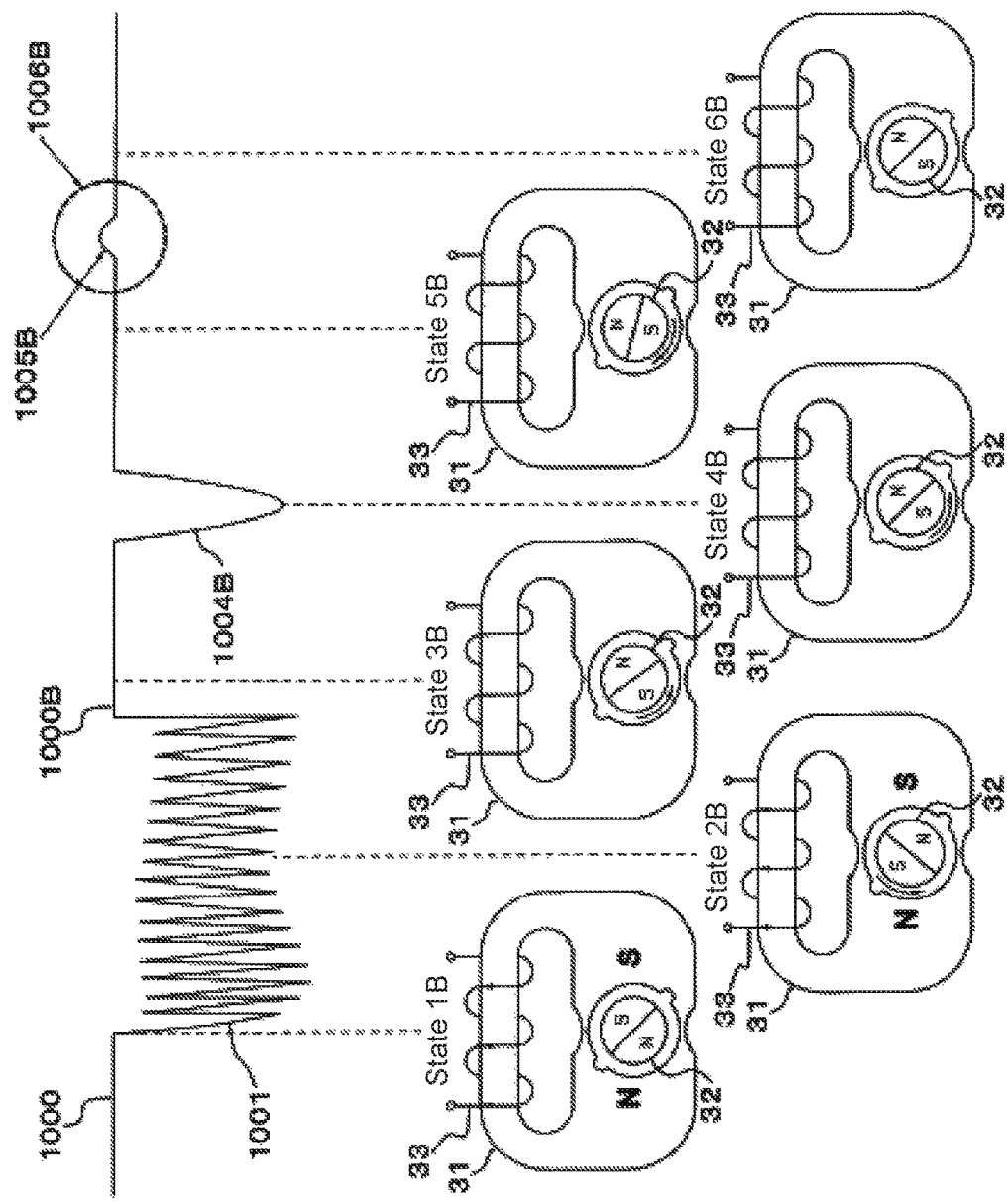
FIG. 4 is a diagram schematically illustrating a relationship between the rotational position of a rotor and driving waveforms (including EMF and back EMF) applied to a motor coil of the stepping motor while at a low temperature.

FIG. 4 is a diagram schematically illustrating a relationship between the rotational position of the rotor 32 and driving waveforms (including EMF and back EMF) applied to the motor coil 33 of the stepping motor 30 while at a low temperature.

Although referred to as driving waveforms, it should be noted that the waveforms (1000, 1001, 1000B, 1004B, and 1005B) depict waveforms driving the motor coil 33 together with EMF (back EMF) arising in the motor coil 33.

Rotational states 1B to 6B of the rotor (the rotor magnet) 32 are indicated as well.

In FIG. 4, a driving waveform 1000 indicates a driving waveform at a voltage of 0, when no driving voltage is applied. At this time, the rotational position of the rotor 32 of the stepping motor 30 corresponds to state 1B.

Next, a driving waveform 1001, having a repeating pulse form due to a driving pulse, is applied to the motor coil 33 for a prescribed amount of time. Note that the driving waveform 1001 illustrated in FIG. 4 is the same as the driving waveform 1001 illustrated in FIG. 3. Additionally, state 1B indicating the rotational position of the rotor 32 of the stepping motor 30 in FIG. 4 is the same as state 1A in FIG. 3.

When the microcomputer 10 applies the driving waveform 1001, the rotor 32 rotates to the left to state 2B. The rotor 32 then further rotates to the left to state 3B.

When the rotor 32 is in state 3B, the driving waveform returns to a voltage of 0 as a driving waveform 1000B. However, inertia causes the rotor 32 to continue to rotate to the left, reaching state 4B.

As described earlier, the DC resistance value decreases at low temperatures, and thus the current flowing in the motor coil 33 increases, the magnetic flux produced increases, and the rotation speed of the rotor 32 increases as well. As such, the rotational position of the rotor (rotor magnet) 32 differs between state 2B in FIG. 4 and state 2A in FIG. 3.

In other words, the rotor (rotor magnet) 32 has rotated farther in state 2B in FIG. 4 than in state 2A in FIG. 3.

The rotational position of the rotor (rotor magnet) 32 differs in the same manner between state 3B in FIG. 4 and state 3A in FIG. 3.

In state 4B in FIG. 4, the positional relationship between the N pole (mainly the N pole) of the rotor (rotor magnet) 32 and the motor coil 33 causes EMF (back EMF), indicated by a waveform 1004B, to arise in the motor coil 33.

Note that the position of the rotor (rotor magnet) 32 in state 4B in FIG. 4, where the waveform 1004B arises, is generally the same as the position of the rotor (the rotor magnet) 32 in state 4A in FIG. 3, where the waveform 1004A arises.

In state 4B in FIG. 4 too, inertia causes the rotor 32 to continue rotating to the left and reach state 5B. The rotor 32 then rebounds and rotates to the right. This corresponds to state 5B.

As described earlier, the DC resistance value decreases at low temperatures, and thus the current flowing in the motor coil 33 increases, the magnetic flux produced increases, and the rotation speed of the rotor 32 increases as well. As such, the rotational position of the rotor 32 differs between state 5B in FIG. 4 and state 5A in FIG. 3.

Note that in state 3B in FIG. 4, the rotor 32 is pulled by magnetism (including residual magnetism) of the stator 31, which has a braking effect on the rotation of the rotor 32, in order to bring the timing at which the driving pulses 1001 end closer to the rotational position state of the rotor 32.

Upon passing state 5B, the rotor 32 rebounds between rotation to the right and rotation to the left. The rebound gradually tapers off until the rotor 32 converges on and stops at state 6B, which is a second stable point.

In the period where this rebound occurs (between states 5B and 6B), EMF (an EMF voltage waveform) 1005B arises in the motor coil 33.

The rotational position and rotation speed of the rotor 32 in state 5B in FIG. 4 are different from the rotational position and rotation speed of the rotor 32 in state 5A in FIG. 3. As such, the phenomenon of rebound between right and left rotation, occurring between state 5B and state 6B, differs as well.

As described earlier, when the rotor 32 is pulled by the magnetism (including residual magnetism) of the stator 31 and a braking effect is applied to the rotation of the rotor 32, rebound in the rotation of the rotor decreases, and the EMF (EMF voltage waveform) 1005B has a smaller waveform than the EMF (EMF voltage waveform) 1005A.

Functioning as the rotation detection determination circuit 105 (FIG. 1), via the driving circuit 20 (FIGS. 1 and 2), the processor 11 (the microcomputer 10) uses the EMF 1005B indicated in FIG. 4 as a rotation detection signal 1006B to detect and determine whether or not the rotor 32 (the stepping motor 30) has correctly rotated 180 degrees. However, when the waveform of the EMF 1005B is smaller as described earlier, there are cases where the EMF required for rotation detection cannot be obtained, or can be obtained but is insufficient for stable rotation detection and determination.

Measures taken in this case will be described next.

<Relationship Between Driving Waveforms and Rotational Position of Rotor 32 when Rotation Assistance Pulse is Inserted while at Low Temperature>

A method for avoiding a situation in which a rotation detection signal cannot be obtained due to the rotation speed of the rotor 32 increasing will be described with reference to the drawings.

Figure 5:
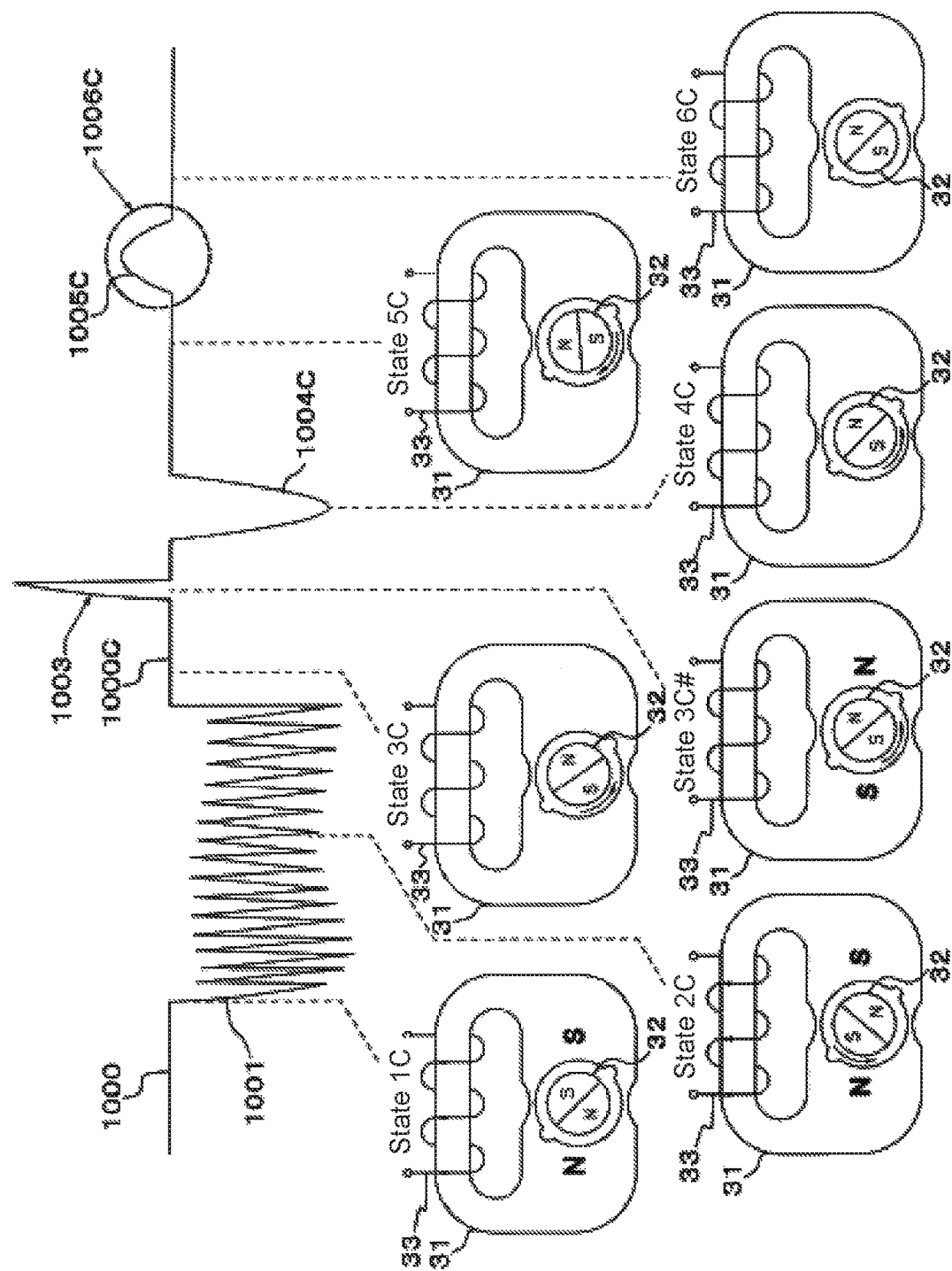
FIG. 5 is a diagram schematically illustrating a relationship between the rotational position of a rotor and normal-temperature driving waveforms (including EMF and back EMF) applied to a motor coil of the stepping motor, when a rotation assistance pulse is inserted while at a low temperature.

FIG. 5 is a diagram schematically illustrating a relationship between the rotational position of the rotor 32 and normal-temperature driving waveforms (including EMF and back EMF) applied to the motor coil 33 of the stepping motor 30, when a rotation assistance pulse is inserted while at a low temperature.

Although referred to as driving waveforms, it should be noted that the waveforms (1000, 1001, 1000C, 1003, 1004C, and 1005C) depict waveforms driving the motor coil 33 together with EMF (back EMF) arising in the motor coil 33.

Rotational states 1C to 3C, 3C#, and 4C to 6C of the rotor (the rotor magnet) 32 are indicated as well.

In FIG. 5, driving waveforms 1000, 1001, and 1000C, and states 1C to 3C of the rotor 32, correspond to and are the same as the driving waveforms 1000, 1001, and 1000B, and states 1B to 3B of the rotor 32 indicated in FIG. 4.

The driving waveforms in FIG. 5 differ from those in FIG. 4 in that a rotation assistance pulse 1003 is further applied in state 3C# of the rotor 32.

State 3C in FIG. 5 is generally the same as state 3B in FIG. 4. As described earlier, in state 3B in FIG. 4, the rotor 32 is pulled by magnetism (including residual magnetism) of the stator 31, which has a braking effect on the rotation of the rotor 32, in order to bring the timing at which the driving pulses 1001 end closer to the rotational position state of the rotor 32.

In the same manner, in state 3C in FIG. 5, the rotor 32 is pulled by the magnetism (including residual magnetism) of the stator 31, which has a braking effect on the rotation of the rotor 32, and the rotation speed decreases as a result.

To once again increase the rotation speed of the rotor 32, which has slowed in state 3C in FIG. 5, the rotation assistance pulse 1003 indicated in FIG. 5 is applied in state 3C#. In other words, after the driving waveform 1001 has been outputted but before the EMF indicated by a waveform 1004C has been produced by the rotor 32 rotating in response to the driving waveform 1001, the rotation assistance pulse 1003 is further applied to cause the rotor 32 to rotate at a prescribed speed (a higher speed than the rotation speed of the rotor 32 that has slowed as described earlier).

Applying the rotation assistance pulse 1003 once again increases the rotation speed of the rotor 32, such that states 4C, 5C, and 6C indicating the rotational position of the rotor 32 in FIG. 5 become generally the same as states 4A, 5A, and 6A indicating the rotational position of the rotor 32 in FIG. 3.

As a result, in FIG. 5, EMF 1005C is produced in generally the same manner as the EMF 1005A in FIG. 3.

Then, functioning as the rotation detection determination circuit 105 (FIG. 1), the processor 11 (microcomputer 10) detects and determines whether or not the rotor 32 (stepping motor 30) has correctly rotated 180 degrees, using a rotation detection signal 1006C indicated in FIG. 5.

Note that the rotation assistance pulse 1003 has the opposite positive/negative polarity as the voltage applied in the driving pulse 1001 because the state of opposing poles is different. That is, while the S pole of the rotor 32 opposes the motor coil 33 when the driving pulse 1001 is applied (state 1C), the N pole of the rotor 32 opposes the motor coil 33 when the rotation assistance pulse 1003 is applied (state 3C#).

Additionally, the rotation assistance pulse 1003 is applied not only during low temperatures, but also at normal temperature. A waveform in which erroneous operations do not arise is selected when applying the rotation assistance pulse 1003 even at normal temperature.

<Supplemental Explanations>

FIGS. 3, 4, and 5 illustrate waveforms for when the rotor 32 rotates from 0 degrees to 180 degrees. When the rotor 32 rotates from 180 degrees to 360 degrees in the next rotation, the driving waveform 1001 on the negative voltage side is instead a waveform on the positive voltage side, relative to the voltage of 0 indicated by the driving waveform 1000. That is, the polarities are inverted.

Additionally, although the rotation assistance pulse 1003 is a positive voltage-side waveform in FIG. 3, the rotation assistance pulse 1003 is applied as a negative voltage-side waveform in the next rotation from 180 degrees to 360 degrees.

Furthermore, although the rotation detection signal (1006A, 1006B, and 1006C) is described as decreasing during low temperatures, the rotation detection signal may also decrease in the same manner under high loads.

<Flowchart Illustrating Driving of Stepping Motor 30>

Next, a flowchart illustrating operations carried out by the processor 11 when applying the various types of pulses (driving pulse, rotation assistance pulse, correction pulse, rotation detection pulse) to drive the stepping motor 30 will be described.

Figure 6:
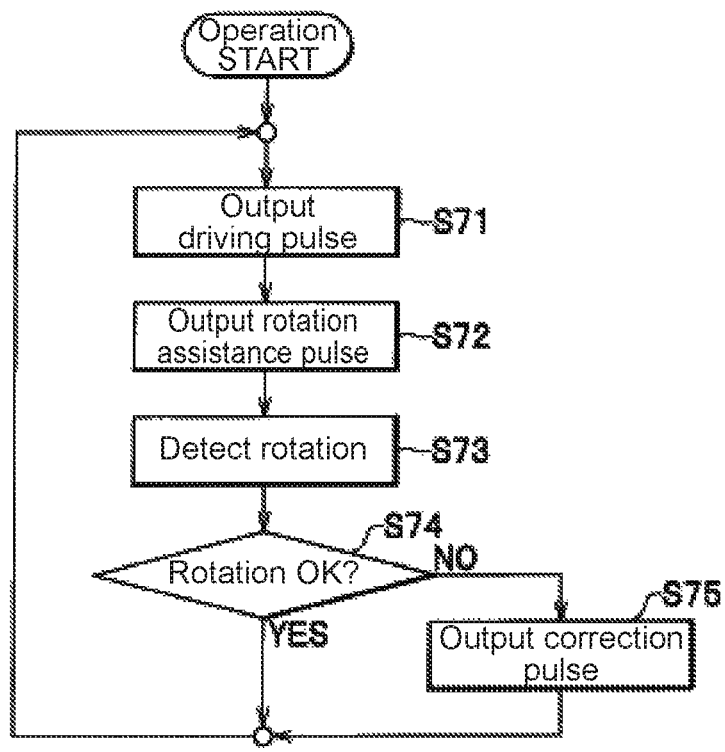
FIG. 6 is a flowchart illustrating a method of driving the stepping motor according to Embodiment 1 of the present invention.

FIG. 6 is a flowchart illustrating a method of driving the stepping motor 30 according to Embodiment 1 of the present invention.

The various steps in the flowchart illustrating the method of driving the stepping motor 30 will be described next.

<Step S71>

After the start of operations, first, in step S71, the microcomputer 10, functioning as the motor controller 100, outputs the driving pulse (1000; FIG. 5) in the pulse-form driving waveform generated by the driving pulse generating circuit 102 (FIG. 1) and applies that driving pulse to the motor coil 33 of the stepping motor 30.

The rotor 32 of the stepping motor 30 is rotated to a prescribed position by this driving pulse.

<Step S72>

Next, in step S72, the microcomputer 10, functioning as the motor controller 100, outputs the rotation assistance pulse 1003 (FIG. 5) generated by the rotation assistance pulse generating circuit 103 (FIG. 1) and applies the rotation assistance pulse 1003 to the motor coil 33 of the stepping motor (FIG. 5).

Note that the rotation assistance pulse 1003 is applied to the motor coil 33 after the driving pulse 1001 is outputted but before the EMF 1004C is produced by the rotation of the rotor 32 of the stepping motor 30 due to the driving pulse 1001.

This pulse once again increases the rotation speed of the rotor 32, which has slowed, thus causing the rotor 32 to rotate at a prescribed speed.

<Step S73>

Next, in step S73, the microcomputer 10, functioning as the motor controller 100, carries out rotation detection.

Note that the driving circuit 20 (FIG. 1) sends the rotation detection signal 1006C from the motor coil 33 (FIG. 5) of the stepping motor 30 (FIG. 2) to the rotation detection determination circuit 105 of the motor controller 100 (FIG. 1) at the timing of the rotation detection pulse generated by the rotation detection pulse generating circuit 104 (FIG. 1).

<Step S74>

Next, in step S74, the microcomputer 10, functioning as the motor controller 100, detects and determines whether or not the rotor 32 of the stepping motor 30 has correctly rotated 180 degrees in response to the rotation detection signal 1006B sent from the rotation detection determination circuit 105 (FIG. 1).

In the case where it is determined that the rotor 32 (the stepping motor 30) has correctly rotated 180 degrees (YES), the flow ends and returns to step S71, after which the next cycle starts.

On the other hand, in the case where it is determined that the rotor 32 (the stepping motor 30) has not correctly rotated 180 degrees, the process moves to step S75.

<Step S75>

Step S75 is carried out in the case where, as described above, it is determined that the rotor 32 of the stepping motor 30 has not rotated to the prescribed position. Thus a correction pulse is outputted to rotate the rotor 32 (the stepping motor 30) to the prescribed position (a rotation of 180 degrees) with certainty.

Then, the flow ends and returns to step S71, after which the next cycle starts.

<Supplemental Explanations>

When the flow illustrated in FIG. 6 ends and returns to step S71, and the next cycle starts, the flowchart from steps S71 to S75 is the same.

However, the positive and negative polarities of the pulse voltages are inverted in the driving pulse output in step S71, the rotation assistance pulse output in S72, and so on in the next cycle.

Furthermore, with respect to the correction pulse in step S75, a prescribed correction pulse is generated by the driving pulse generating circuit 102 (FIG. 1), or the motor controller 100 (FIG. 1) is provided with a correction pulse generating circuit (not illustrated) and that circuit generates and outputs the correction pulse.

<Program Driving Stepping Motor 30>

The flowchart illustrating the driving of the stepping motor 30 illustrates a method of driving the stepping motor 30 through steps S71 to S75. However, the steps can also be interpreted as individual processes realized by programming the microcomputer 10 (FIG. 1).

In other words, step S71 can also be interpreted as "a process of generating and outputting a driving pulse that rotates the rotor of the stepping motor to a prescribed position," step S72 as "a process of outputting a rotation assistance pulse for rotating the rotor of the stepping motor at a prescribed speed, after outputting the driving pulse but before EMF is produced by the rotation of the rotor of the stepping motor caused by the driving pulse, step S73 as "a process of detecting whether or not the rotor of the stepping motor has rotated to the prescribed position," step S74 as "a process of determining whether or not the rotor of the stepping motor has rotated to the prescribed position," and step S75 as "a process of outputting a correction pulse that rotates the rotor 32 to the prescribed position with certainty."

Embodiment 2: Electronic Timepiece 1

An electronic timepiece 1 (time display device) according to Embodiment 2 of the present invention will be described next.

Figure 7:
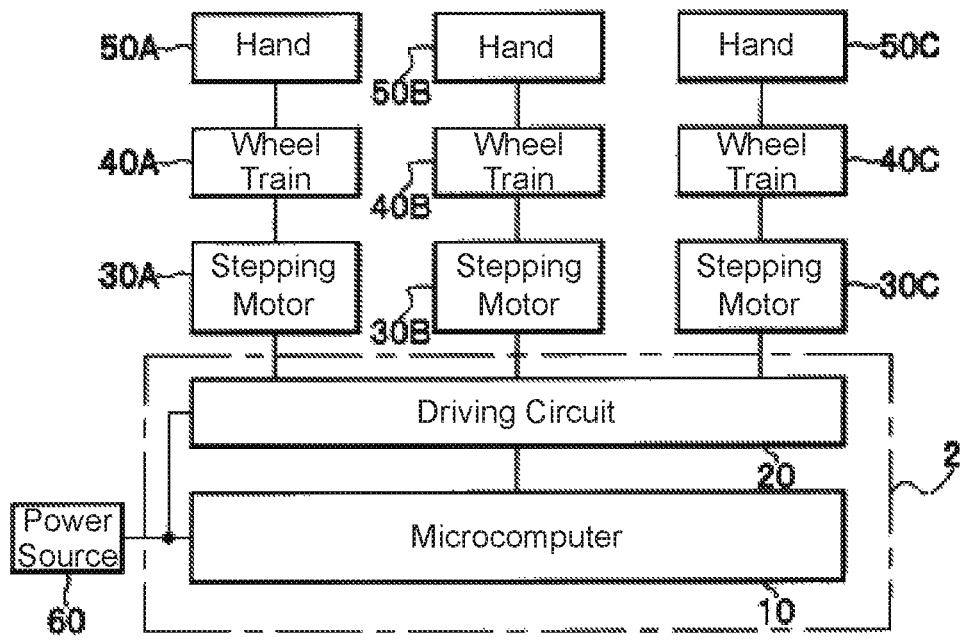
FIG. 7 is a diagram illustrating an example of the configuration of an electronic timepiece according to Embodiment 2 of the present invention.

FIG. 7 is a diagram illustrating an example of the configuration of the electronic timepiece 1 according to Embodiment 2 of the present invention.

The electronic timepiece 1 includes the microcomputer 10, the driving circuit 20, stepping motors 30A, 30B, and 30C, wheel train mechanisms 40A, 40B, and 40C, hands (display portions) 50A, 50B, and 50C, a power source 60, and so on.

In FIG. 7, the stepping motor driving device 2, the microcomputer 10, and the driving circuit 20 are as described above.

The stepping motor 30A is driven and controlled by the driving circuit 20. Rotational driving force produced by a rotor (32; FIG. 2) of the stepping motor 30A is transmitted to the wheel train mechanism 40A. The wheel train mechanism 40A causes the hand 50A to indicate a time (a display item).

Note that the stepping motor 30A, the wheel train mechanism 40A, and the hand 50A are mechanisms and configurations for a system indicating seconds, for example.

In addition to this system for indicating seconds, for example, the stepping motor 30B, the wheel train mechanism 40B, and the hand 50B constitute a system for indicating minutes, and the stepping motor 30C, the wheel train mechanism 40C, and the hand 50C constitute a system for indicating hours.

The power source 60 supplies power to the microcomputer 10 and the driving circuit 20.

Effects of Embodiment 2

According to the configuration described above, the electronic timepiece 1 includes the microcomputer 10 functioning as the motor controller 100 that outputs a rotation assistance pulse for assisting the rotation of a motor, to detect whether or not the motor has rotated. As such, the electronic timepiece 1 has an effect of improving the temperature characteristics of rotation detection and improving the precision as a timepiece.

Other Embodiments and Variations

Although the present invention has been described in detail on the basis of the foregoing embodiments, the present invention is not intended to be limited to those embodiments, and many variations can be made thereon without departing from the essential spirit thereof.

Other such embodiments and variations will be described hereinafter.

<Stepping Motor Driving Device>

Referring to FIG. 1, when the stepping motor driving device according to Embodiment 1 of the present invention is described, the stepping motor driving device corresponds to the microcomputer 10. Alternatively, the stepping motor driving device 2 is described as being constituted of the microcomputer 10 along with the driving circuit 20, which serves as another device. However, the device is not limited thereto.

For example, the microcomputer 10 may be provided with the functions of the driving circuit 20 so as to realize a single piece of hardware (a chip) that serves as the stepping motor driving device.

<Driving Pulse after Detection of No Rotation>

In the case where no rotation is detected and the correction pulse is outputted, the waveform of the driving pulse may be changed in the next period. For example, in the pulse-form waveform of the driving pulse, the duty of the waveform of the pulse fluctuating between on and off may be changed. The waveform may instead be changed to a square wave that is a fully-on waveform. Alternatively, the pulse width may be increased.

<Rotation Assistance Pulse and Temperature Sensor>

Although Embodiment 1 describes the rotation assistance pulse as being inserted as a matter of necessity, the configuration is not limited to this method. For example, a method is also possible in which a temperature sensor is provided and the rotation assistance pulse is not outputted (is stopped) in the case where a temperature detected by the temperature sensor is greater than or equal to a prescribed temperature and the stepping motor is within a prescribed temperature range in which the stepping motor can reliably move the hands of a timepiece.

In this case, eliminating the rotation assistance pulse makes it possible to reduce excess power consumption.

Additionally, although Embodiment 1 describes further applying the rotation assistance pulse 1003 after the driving waveform 1001 is outputted but before the EMF indicated by the waveform 1004C is produced, the configuration is not limited thereto. As long as a rotation detection signal 1006C that enables the rotation detection determination circuit 105 to detect and determine whether or not the rotor 32 has correctly rotated 180 degrees, the rotation assistance pulse 1003 may also be applied after the EMF indicated by the waveform 1004C is produced.

<Rotation Assistance Pulse and Correction Pulse>

Although Embodiment 1 describes the rotation assistance pulse as being inserted as a matter of necessity, the configuration is not limited to this method. At low temperatures, high loads, or the like, the correction pulse may be deemed necessary as a result of the rotation detection carried out by the rotation detection determination circuit 105 (FIG. 1), and a prescribed number of correction pulses are outputted consecutively. In this case, it may be assumed that the output of the correction pulse will assure reliable rotation, and thus the output of the rotation assistance pulse may be stopped for a prescribed period. This provides an effect of reducing the power (current) consumed by outputting the rotation assistance pulse.

Note that when it is determined that the correction pulse has been continuously outputted, the prescribed number of pulses, the prescribed period for which to stop the output of the rotation assistance pulse, and so on can be set as appropriate assuming changes in the temperature, load, or the like. For example, the prescribed period may be a unit such as one minute, one hour, or one day. Meanwhile, the prescribed number of pulses may be 10, 60, or 1,000, for example.

<Rotation Angle System>

In Embodiment 1 of the present invention, the system is such that the rotor moves 180 degrees with each driving pulse (0 degrees to 180 degrees, and 180 degrees to 360 degrees). However, the method of inserting the rotation assistance pulse is also useful when detecting rotation in a system in which the rotor advances 60 degrees with each pulse (0 degrees to 60 degrees, 60 degrees to 120 degrees, and so on up to 300 degrees to 360 degrees).

The method of inserting the rotation assistance pulse is also useful when detecting rotation in a system in which the angle to which the rotor advances with each pulse is set as desired, for example to 90 degrees (0 degrees to 90 degrees, 90 degrees to 180 degrees, 180 degrees to 270 degrees, and 270 to 360).

<Electronic Timepiece 1>

Embodiment 2 describes the electronic timepiece 1 as including three stepping motors corresponding to three hands, namely seconds, minutes, and hours. However, the number of stepping motors is not limited to three. The method of the present invention can also be applied in an electronic timepiece including four or more stepping motors, such as a stopwatch or a timepiece that tells the time for a different time zone.

The method of the present invention can also be applied in an electronic timepiece having only one or two stepping motors.

Meanwhile, in the case where the date or day of the week is to be displayed, the display is not limited to hands. The system may be such that the date or day of the week is indicated on a surface and the surface rotates or moves.

The display portion may also provide information aside from the time indicated by hands. For example, another circuit may be provided in the peripheral 15 of the microcomputer 10 so as to add other information through a liquid-crystal display.

Additionally, the electronic timepiece may include a plurality of microcomputers 10 or a plurality of CPUs (processors) 11.

<Device Provided with Stepping Motor Driving Device>

Although Embodiment 2 describes a case where the electronic timepiece (time display device) 1 is provided with the stepping motor driving device, the device is not limited to an electronic timepiece.

Instead of an electronic timepiece (time display device), the stepping motor driving device illustrated in FIG. 1 may be provided in any device including a stepping motor, such as a device that uses a stepping motor to count a number of objects.

<Dedicated IC>

Although Embodiment 1 describes the stepping motor driving device as being configured using a microcomputer 10, the device is not limited thereto.

The method of using the microcomputer 10 as per Embodiment 1 is effective in the case where an electronic timepiece including the stepping motor driving device implements various functions aside from the motor control function for a timepiece. However, a limited-function dedicated IC (dedicated hardware) may be used instead of a microcomputer in the case of a simple device whose function is limited to the motor control function for a timepiece, for example.

Using a dedicated IC (dedicated hardware) means that a processor (microcomputer) is not used, which generally simplifies the processes in each operation and reduces the scale of circuitry operation at high frequencies. This in turn reduces the amount of power consumed. Hardware can also generally be miniaturized, which provides an effect of reducing costs involved in mass-production. It is understood to persons skilled in the art that various modifications or improvements can be made to the specific embodiments described above, and such modifications and improvements are included within the technical scope of the present invention as defined by the claims.

What is claimed is:

1. A driving device, comprising:
    a stepping motor including a rotor and a coil to rotate the rotor; and
    a processor that drives the stepping motor,
    wherein the processor:
    generates a driving pulse for rotating the rotor of the stepping motor to a prescribed position, and outputs the driving pulse to the coil; and
    after outputting the driving pulse but before said driving pulse causes electromotive force to be generated by the rotation of the rotor of the stepping motor, generates a rotation assistance pulse for rotating the rotor of the stepping motor at a prescribed speed.

2. The driving device according to claim 1, wherein the processor:
    determines whether or not the rotor of the stepping motor has rotated to the prescribed position; and
    when it is determined that the rotor of the stepping motor has not rotated to the prescribed position, outputs a correction pulse for rotating the rotor to the prescribed position.

3. The driving device according to claim 2, further comprising:
    a temperature sensor,
    wherein the processor:
    stops the output of the rotation assistance pulse when it is determined that a temperature detected by the temperature sensor is greater than or equal to a prescribed temperature.

4. An electronic timepiece, comprising:
    a hand indicating one of seconds, minutes, hours, a date, and a day of the week;
    a wheel train mechanism that transmits power to the hand; and
    the driving device according to claim 3 that drives the wheel train mechanism.

5. An electronic timepiece, comprising:
    a hand indicating one of seconds, minutes, hours, a date, and a day of the week;
    a wheel train mechanism that transmits power to the hand; and
    the driving device according to claim 2 that drives the wheel train mechanism.

6. The driving device according to claim 1, further comprising:
    a temperature sensor,
    wherein the processor:
    stops the output of the rotation assistance pulse when it is determined that a temperature detected by the temperature sensor is greater than or equal to a prescribed temperature.

7. An electronic timepiece, comprising:
    a hand indicating one of seconds, minutes, hours, a date, and a day of the week;
    a wheel train mechanism that transmits power to the hand; and
    the driving device according to claim 6 that drives the wheel train mechanism.

8. An electronic timepiece, comprising:
    a hand indicating one of seconds, minutes, hours, a date, and a day of the week;
    a wheel train mechanism that transmits power to the hand; and
    the driving device according to claim 1 that drives the wheel train mechanism.

9. A method of driving a stepping motor, comprising:
    outputting a driving pulse that rotates a rotor of the stepping motor to a prescribed position; and
    after outputting the driving pulse but before said driving pulse causes electromotive force to be generated by the rotation of the rotor of the stepping motor, outputting a rotation assistance pulse for rotating the rotor of the stepping motor at a prescribed speed.

10. A non-transitory storage medium having stored therein instructions executable by a processor serving as a driving device that drives a stepping motor, the instructions causing the processor to perform the following:
    outputting a driving pulse that rotates a rotor of the stepping motor to a prescribed position; and
    after outputting the driving pulse but before said driving pulse causes electromotive force to be generated by the rotation of the rotor of the stepping motor, outputting a rotation assistance pulse for rotating the rotor of the stepping motor at a prescribed speed.

* * * * *